B. L. EPSTEIN.
REGISTERING DEVICE FOR POOL TABLES.
APPLICATION FILED JULY 8, 1909.
1,000,245.
Patented Aug. 8, 1911.
3 SHEETS—SHEET 1.
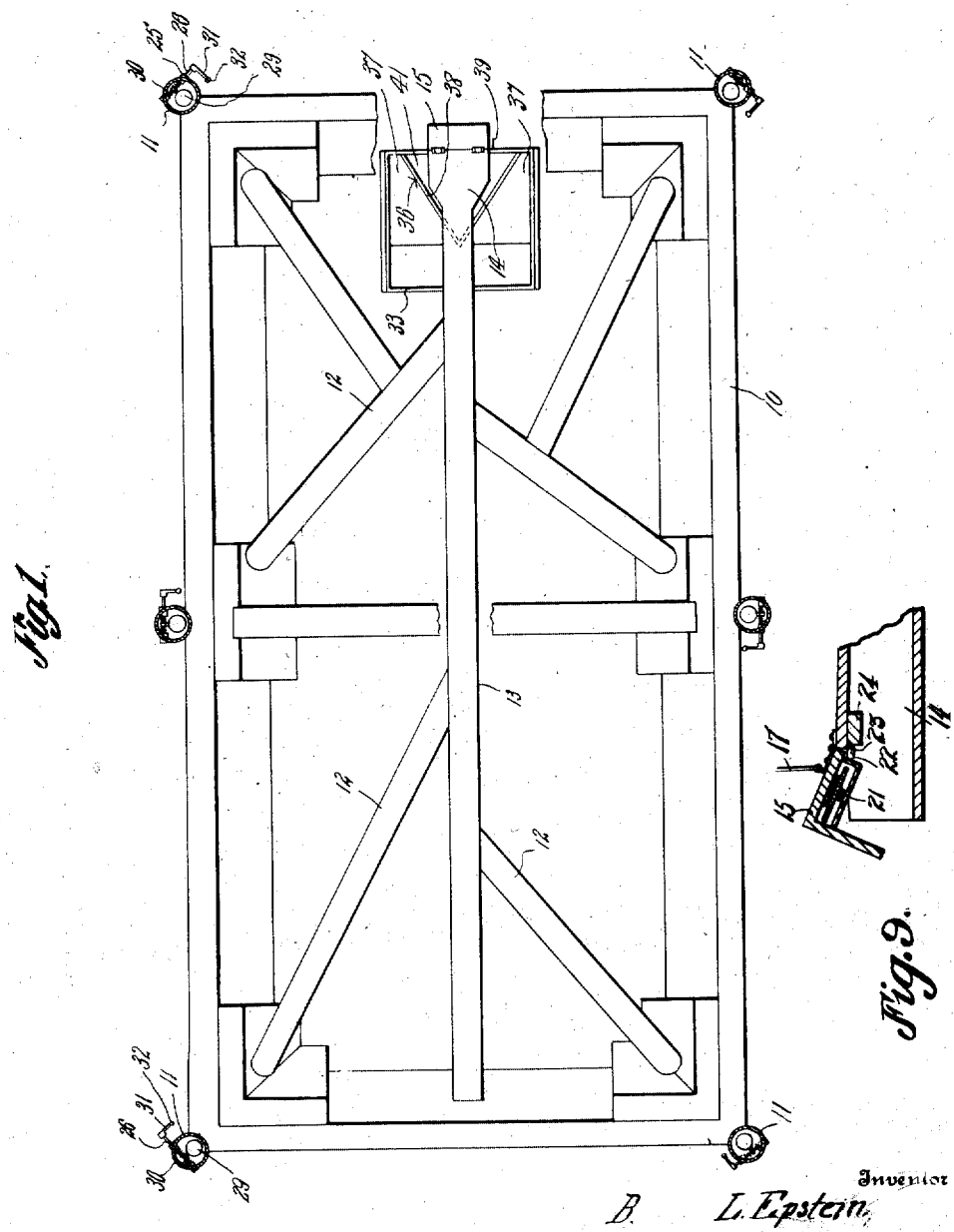

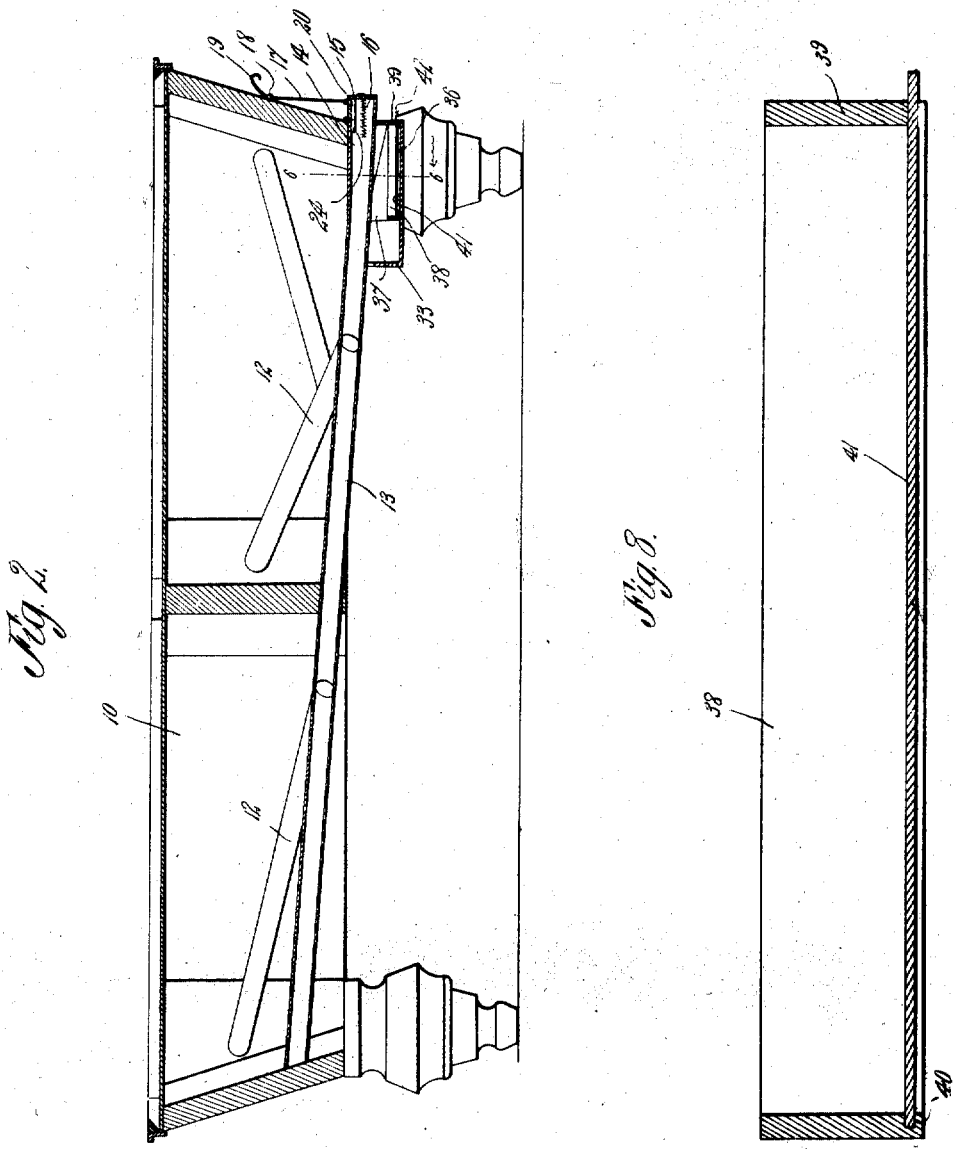

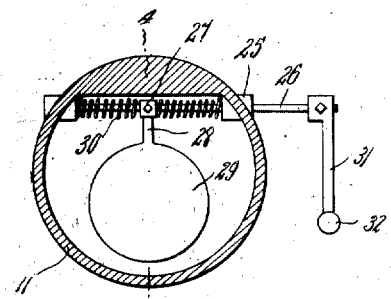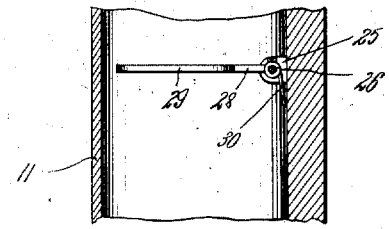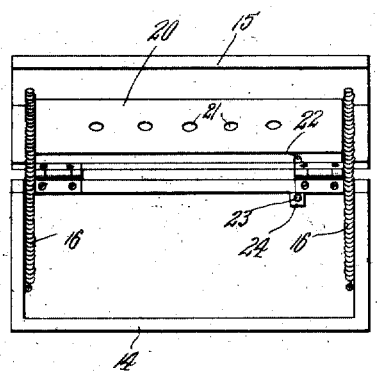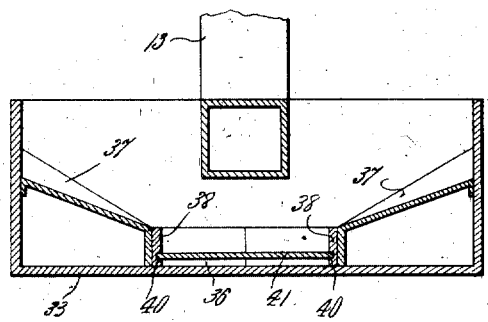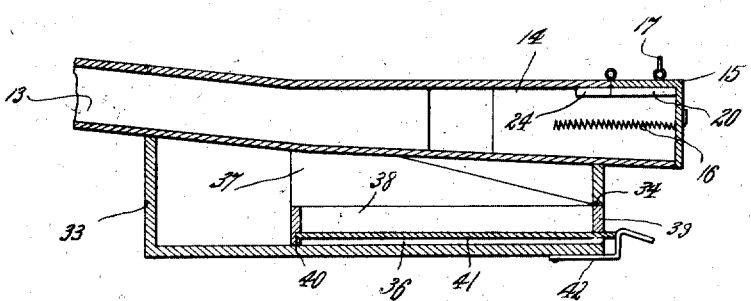

UNITED STATES PATENT OFFICE.

BENJAMIN L. EPSTEIN, OF HAMPTON, VIRGINIA.

REGISTERING DEVICE FOR POOL-TABLES.

1,000,245.

Specification of Letters Patent.

Patented Aug. 8, 1911.

Application filed July 8, 1909. Serial No. 506,531.

*To all whom it may concern:*

Be it known that I, BENJAMIN L. EPSTEIN, a citizen of the United States, residing at Hampton, in the county of Elizabeth City, State of Virginia, have invented certain new and useful Improvements in Registering Devices for Pool-Tables; and I do hereby declare the following to be a full, clear, and exact description of the invention, such as will enable others skilled in the art to which it appertains to make and use the same.

This invention relates to pool tables and has special reference to a form of registering and recording mechanism for use with a pool table so that the number of games played can be accurately counted for any table equipped with this device.

One object of the invention is to provide an improved form of means for gathering the balls at one end of such a table.

Another object of the invention is to provide an improved device to hold the balls in their pockets until manually released so that these balls may be removed and replaced upon the table in the event of the player "scratching."

A third object of the invention is to provide a novel form of rack adapted for use with such a registering mechanism.

A fourth object of the invention is to provide a novel form of receptacle for the rack so that the balls may be kept protected from dust and dirt when not in use.

With the above and other objects in view as will be hereinafter apparent, the invention consists in general of an improved form of registering mechanism arranged to retain a set of balls gathered by chutes extending from the pockets, together with means for retaining the balls in the pockets until manually released therefrom, and other means for quickly racking the balls when released from the registering mechanism.

The invention further consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a top plan view of a pool table constructed in accordance with this invention, the body of the table being removed in order to better disclose the working parts of said invention. Fig. 2 is a longitudinal section of a table constructed and equipped in accordance with this invention. Fig. 3 is an enlarged detail plan view of one of the pockets, the view being a section taken just below the bed of a table. Fig. 4 is a detail sectional view on the line 4—4 of Fig. 3. Fig. 5 is an enlarged detail view of the mechanism shown at the right hand end of Fig. 2. Fig. 6 is a section on the line 6—6 of Fig. 2. Fig. 7 is a detail front elevation of the registering mechanism showing the same in position to release the balls. Fig. 8 is a longitudinal section through the rack used with this invention. Fig. 9 is a fragmentary sectional view showing the register and actuating means.

The numeral 10 indicates the frame of a pool table of any ordinary construction, and this table is provided with the usual corner and side pockets from which extend downward chutes 11 having inwardly and downwardly inclined portions 12 which lead, either directly or through other chutes, to a centrally disposed inclined chute 13. This chute 13 terminates at the foot of the table, here shown as the right hand end in Figs. 1 and 2, in an enlarged ball receptacle 14 provided with side and bottom portions which extend beyond the top portion, and to this top portion is hinged an angled closure 15 which covers the top and end of the projecting sides and bottom portions. This closure 15 is normally held in closed position and against opening by the pressure of the balls by means of suitable springs 16. Secured to the top of this closure 15 adjacent the free edge of the top portion is a pull rod 17 which extends upward through a suitable guide 18 secured to the table frame, and this pull rod terminates in a handle portion 19 so that by reaching downward beneath the table rail the handle may be grasped and the closure 15 opened to permit the balls to pass therefrom.

Mounted on the closure 15 is a registering mechanism 20 which is preferably in the form of one of the devices known as revolution or stroke counters and the mechanism of which is not deemed necessary here to be shown as it is intended to use some one of the devices now on the market. As is well understood, these revolution or stroke counters are provided with a series of dials which are exposed through openings 21 and are actuated by a step by step movement. This step by step movement is commonly accessible through an aperture 22 and is operated by a rod projecting into this aperture. In the present instance, this rod is replaced by a stud 23 projecting from a block 24 carried in the receptacle 14 and so arranged that every time the closure is shut the stud 23 enters the aperture 22 and operates the step by step mechanism contained in the register 20. It will now be obvious that whenever the balls are released by opening the closure 15, the register mechanism will be actuated by the shutting of the closure and the game will thus be recorded on the dials which are exposed through the openings 21.

In order to obviate the necessity of opening the receptacle 14 before the end of the game, below each of the pockets on the table and immediately adjacent thereto the chute 11 is provided with bearing bosses 25 wherethrough passes a shaft 26 and on this shaft is held a collar 27 from which projects a stem 28 carrying a trap plate 29. Surrounding the shaft 26 inside of the chute 11 is a coil spring 30 which is so arranged as to normally hold the trap plate horizontal. This spring 30 is of sufficient strength to prevent the dropping of the balls deflecting the trap plate downward so that the ball is normally held above said trap plate and is accessible to the player in the event that he desires to replace the same on the table as in the case of his "scratching." In order to depress the trap plate 29 the shaft 26 projects through one of the bosses 25 and there is mounted on the outer end thereof an arm 31 which, at its free end, is equipped with a thumb plate 32 so that if a player has finished his shots he depresses the thumb plate 32 and this causes the trap plate 29 to rotate downward and frees the ball, thus permitting it to run down the chutes into the receptacle 14.

In order to catch the balls when they have been released from the receptacle 14 there is provided a sliding drawer 33 which is mounted beneath the frame of the table and this sliding drawer has its front wall provided with a suitable notch to permit the receptacle 14 passing therethrough. The forward wall of this drawer is furthermore open at its lower part as indicated at 34 for the reception of a rack hereinafter to be described. Within this drawer there is provided a triangular space 36 which is formed by the front wall of the drawer and a pair of blocks 37 on the bottom of the drawer, the top faces of the blocks being synclinally arranged so that they slant downward toward the triangular space 36.

The rack used with this invention consists of the usual triangular frame having side members 38 and a base member 39 but in this instance the base member is of less depth than the side members, and these side members are provided at their bottom edges with notches 40 for the reception of a bottom plate 41 which is slidably mounted within these notches and has its basal edge projecting beyond the relatively narrow base member 39. In order to retain the rack in position in the triangular space 36 the bottom of the drawer 33 is provided with a suitable spring catch 42 which, when the rack is in position, rises behind said rack and prevents its accidental withdrawal or the accidental disengagement of the bottom 41 from the notches 40.

In using this device the drawer is pulled out when the game begins so that the rack lies beneath the end of the receptacle 14. The players then shoot in the usual manner and after each player has shot the balls are released from the pockets by depressing the thumb piece 32 of those pockets which contain any balls thus permitting the balls to travel down into the receptacle 14. When the game has been won the handle 19 is pulled and this permits the balls to fall from the receptacle 14 into the rack, any of the balls which strike the blocks 37 rolling downward into the rack by reason of the inclination of the surfaces of these blocks. When all of the balls are freed from the receptacle the rack is removed by depressing the spring 42 and placed upon the table. If any other balls remain on the table they are then placed in the rack and the bottom 41 drawn out, after which the balls may be spotted in the ordinary manner. Meanwhile the handle 19 has been released and the closure 15 drawn shut by the springs 16. This, as previously described, causes the registering mechanism to be actuated and the game is indicated on the register. At suitable intervals of time the register may be examined and compared with the receipts, thus acting as a check and insuring the payments for all games played. At the end of the final game all of the balls are rolled down the chutes and that game registered in the usual manner, the balls are allowed to remain in the rack and the drawer closed thus protecting said balls from dust and dirt.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a pool table, a pocket, an inclined chute communicating with said pocket, a closure hinged to the discharge end of said chute and forming a stop for balls in the chute, a spring holding said closure shut against opening by the pressure of said balls, a register on said closure, and means on said chute actuating said register upon movement of the closure to closed position.

2. In a pool table, a pocket, an inclined chute communicating with said pocket and terminating at its discharge end in a ball receptacle, the side and bottom of which extends beyond the top portion thereof, an angular closure hinged at one end to the top portion and extending to the edges of said side and bottom and forming a stop for balls in said closure, a spring holding said closure against opening by the pressure of balls, a register on said closure, and means on said chute actuating said register upon movement of the closure to closed position.

3. In a pool table, a pocket, a chute communicating with said pocket, a releasable valve in said pocket forming a closure for the intake end of said chute, an angular closure hinged to the discharge end of said chute and forming a stop for balls in said chute, a register on said angular closure, and means on said chute actuating said register upon movement of the angular closure to closed position.

4. In a pool table, a pocket, a chute communicating with said pocket, a spring controlled valve in said pocket forming a closure for the intake end of said chute, means for manually releasing said valve, a closure hinged at the discharge end of said chute and forming a stop for balls in said chute, a spring normally holding said closure shut against opening by the pressure of said balls, means for manually opening said closure, a register on said closure, and means on said chute actuating said register upon movement of the closure to closed position.

5. In a pool table, a pocket, a chute leading from the bottom of the pocket, a shaft passing through said chute adjacent the side thereof, a stop plate connected to said shaft to form a valve for said pocket, a spring normally holding said stop plate across said chute, an operating arm attached to said shaft exterior of the chute, a ball receptacle provided with an opening and connected to said chute, a closure for said opening, a registering mechanism, and means actuated by the closing of said closure to operate the registering mechanism.

In testimony whereof, I affix my signature in presence of two witnesses.

BEN. L. EPSTEIN.

Witnesses:
ISAAC KIRSNER,
H. H. HOE.